United States Patent [19]

Guenther

[11] 4,255,222

[45] Mar. 10, 1981

[54] APPARATUS FOR SPLICING THERMOPLASTIC YARNS

[75] Inventor: Lloyd M. Guenther, Severna Park, Md.

[73] Assignee: Chevron Research Company, San Francisco, Calif.

[21] Appl. No.: 103,817

[22] Filed: Dec. 17, 1979

[51] Int. Cl.³ .................... B65H 69/06; B65H 69/08
[52] U.S. Cl. .................... 156/433; 156/499; 156/502; 156/510; 156/579
[58] Field of Search .................... 156/158, 159, 304.6, 156/499, 502, 507, 510, 579, 433

[56] References Cited

U.S. PATENT DOCUMENTS

| | | | |
|---|---|---|---|
| 2,863,492 | 12/1958 | Chang et al. | 156/158 |
| 3,070,947 | 1/1963 | DeToledo et al. | 156/158 |
| 3,160,547 | 12/1964 | Williams | 156/502 |
| 3,184,354 | 5/1965 | Strother | 156/158 |
| 3,294,614 | 12/1966 | Abelsma | 156/433 |
| 3,301,735 | 1/1967 | Williams | 156/502 |
| 3,323,971 | 6/1967 | Williams | 156/502 |
| 3,492,181 | 1/1970 | Riseley | 156/158 |
| 3,607,559 | 9/1971 | Williams | 156/502 |
| 3,690,994 | 9/1972 | Williams | 156/502 |
| 4,106,973 | 8/1978 | Wright | 156/433 |

Primary Examiner—Michael G. Wityshyn
Attorney, Agent, or Firm—D. A. Newell; T. G. DeJonghe; L. S. Squires

[57] ABSTRACT

A hand-held splicing device for melt butt splicing thermoplastic yarns or tapes together.

The splicing device comprises two-yarn clamping means, a diagonally positioned heat cutting element; means for bringing two clamped yarns in diagonal contact with the melting element and means for simultaneously lifting the severed yarns away from the cutting element and buttwise joining the melted ends together thereby fusing the yarns together. The device and mode of operation are characterized by convenience and ease of operation and afford a small strong splice especially desirable for carpet tufting operations.

5 Claims, 18 Drawing Figures

APPARATUS FOR SPLICING THERMOPLASTIC YARNS

BACKGROUND OF THE INVENTION

1. Field of the Invention

This invention relates to the splicing of thermoplastic yarns, and in a further aspect relates to an apparatus for heat-splicing thermoplastic yarns and tapes.

2. The Prior Art

Thermoplastic yarn can be made by a number of methods including, for example, extrusion of relatively large diameter monofilaments or the extrusion of very small diameter filaments which are then entangled and/or twisted together to form larger diameter yarns. Thermoplastic yarns can also be made by extruding narrow films (or tapes) or extruding films and cutting the films into tapes. The tapes are then twisted into yarns. Such yarns are frequently used in the manufacture of carpets. The manufacture of fibrillated tapes which can be twisted into such yarns is, for example, described in my U.S. Pat. No. 3,496,259. Splicing can be used to repair yarns as a result of inadvertent breaks as when too much tension is applied at the ends, or as a purposeful occurrence to form longer yarn lengths. Also in many instances, such as for example in carpet tufting it is desirable to tuft continuously in order to maximize production. Thus, it is desirable to splice roll ends together to avoid having to shut down the tufting operation to rethread new rolls when the existing rolls are used up.

Numerous methods have been used by the art to splice yarns. For example, published German Patent application DT No. 2,450,018, discloses a trigger actuated splicer utilizing a hot wire to cut yarn ends and to provide heat for fusing the yarns together. U.S. Pat. No. 3,492,181 discloses a gun-shaped splicing device utilizing V-shaped holder jaws and a hot-wire cutting-fusing operation. U.S. Pat. No. 3,294,614 discloses a splicer using a rotary action to bring the yarns in contact with a heating coil to fuse the yarns together and U.S. Pat. No. 2,863,492 discloses a splicing device using a heat bonded adhesive to splice the yarns. As pointed out in my prior U.S. Pat. No. 4,138,308, yarn splicing is not a simple matter because the splice must meet both strength and bulk limitations. More specifically the shear strength of the spliced tapes must not fall below a set value, for example, generally about 3 lb. tensile pull for a 1700-denier yarn; and the all-over diameter or maximum transverse width must not adversely effect the utilization of the yarn, for example, where the yarn is used for carpet tufting, the splice must be below the minimum eyelet size of the tufting needles later used in tufting carpet to prevent the yarn splice from binding in the needle. Also, the splicer should be easily handleable and effect the splicing operation as a simple continuous mechanical operation with minimum operator involvement so as to reduce human error to a minimum. Thus, even though numerous prior art methods are disclosed, there is substantial room for improvement in one or more of these areas depending upon the particular prior art splicing method or device used.

SUMMARY OF THE INVENTION

The present invention provides a method and splicing apparatus for splicing yarns which, requires minimal operator involvement and which affords a relatively high strength small diameter splice. Using the splicer of the present invention, the operator merely places the two yarns to be spliced into the splicer and then squeezes a trigger. The present splicer then sequentially mechanically locks the yarns in place, heat severs the yarns on the bias (diagonally) by a hot cutting element, and then simultaneously moves the yarns from the cutting element and presses the molten cut ends together to form a strong yet relatively small diameter splice.

Thus save for the initial placement of the yarns in my splicing apparatus and subsequent removal of the severed yarn ends and spliced yarn, the only function the operator is required to do is to squeeze the trigger means. Thus, operator error or variation is minimized. Further, the present splicer is especially useful for splicing twisted tape yarns and affords a strong splice without the necessity of untwisting the yarns as in my prior device described in the aforementioned patent.

DESCRIPTION OF THE DRAWING

A further understanding of the invention can be had from the following non-limiting drawings of preferred embodiments of the invention wherein like reference numbers refer to like parts.

FIG. 4 is a side view detail of slide block 4a or 4b with a sectional view along line 4—4 of FIG. 4a.

FURTHER DESCRIPTION OF THE INVENTION AND PREFERRED EMBODIMENTS

Figure 2:
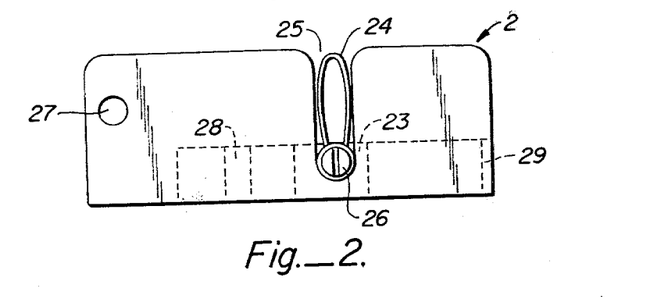
FIG. 2 is a side view detail of support body 2, with yarn retainer spring clips 24 in place.
Figure 2A:
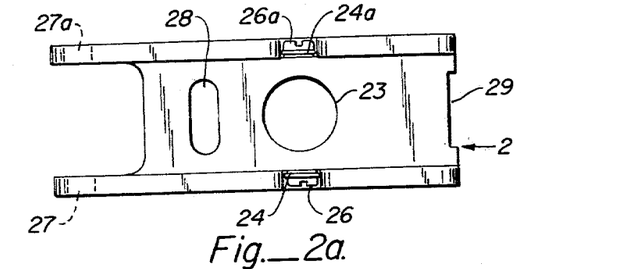
FIG. 2a is a top view detail of support body 2.
Figure 3:
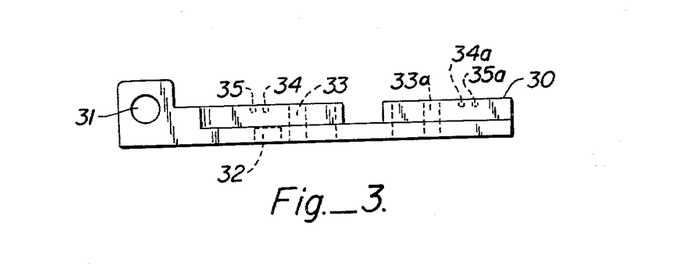
FIG. 3 is a side view detail of slide track 3.
Figure 3A:
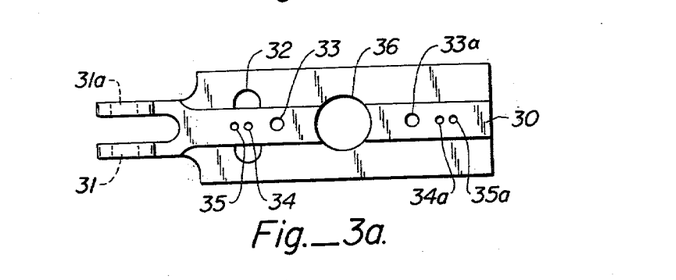
FIG. 3a is a top view detail of slide track 3.
Figure 4:
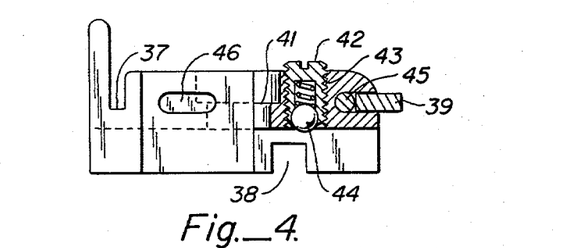
Figure 4A:
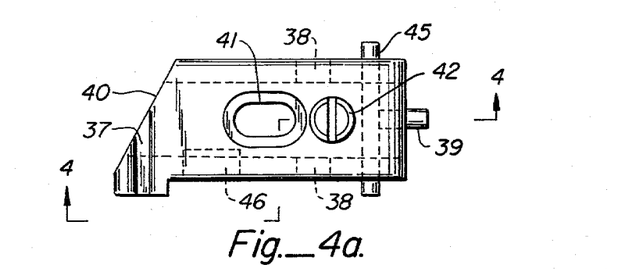
FIG. 4a is a top view detail of slide block 4a or 4b.

The present invention can most easily be described by reference to the drawings. Referring to FIGS. 1 through 5 the principal components of the splicer 1 of the present invention comprise a support body 2, a slide track 3 pivotally mounted in the support body, a pair of slide blocks 4a and 4b mounted on the slide track, and a pair of yarn clamping devices 5a and 5b which ride on the slide blocks and serve to retain the yarns to be spliced in transverse slots 37 in the slide blocks. A heating element 6 is supported from an insulating block 17 in hole 23 (FIG. 2a) in the support base and is heated by an electrical current provided by a transformer (not shown) and interrupted by switch 18 mounted below the support base. The support base fits in a notch in the upper end of a hollow cylindrical handle 7 and can be held in place by suitable fixing means (not shown). The handle also serves as an enclosure for the switch and electrical conductors 19 and 19a. The transformer is preferably connected to the splicing device by a two-conductor electrical cord which is secured to the bottom of the handle by a strain relief device (not shown). Operator control of the splicing device is by means of a trigger 8 which pivots on pin 9, mounted through holes 27 and 27a (FIGS. 2 and 2a) in the support body, against trigger spring 15. Two links 10a and 10b convert rotary motion of the trigger arm into linear motion at the slide blocks so that when the trigger is squeezed, the two slide blocks are brought together. Further rotation of the trigger arm will pivot the slide track upward about the same pin 9 passing through holes 31 and 31a (FIG. 3). Stop plate 13 limits the upward rotation of the slide track. Stop plate 13 can be affixed to support body 2 by any suitable fastening means 16. Preferably the support body is provided with a recess 29 to accommodate the stop plate. A pin 39 in the end of slide block 4a engages a hole 14 in the stop plate, preventing upward motion of the slide track until the slide blocks have moved sufficiently inward for pin 39 to clear hole 14. Spring 15 is provided to return the trigger to its starting position when finger pressure is released. A switch actuating lever 20 is pivoted at its lower end and bears against switch plunger 21. Its upper end passes through slot 28 (FIG. 2a) in the support body and slot 32 (FIG. 3a) in the slide track and engages notch 38 (FIGS. 1 and 4) in slide block 4b. When the slide block moves inward, the switch is turned on. When the slide track tilts upward, the switch is released. When the trigger is released, spring loaded pivot 22 allows the switch actuating lever to move downward, allowing the slide track to return to its starting position.

Figure 1:
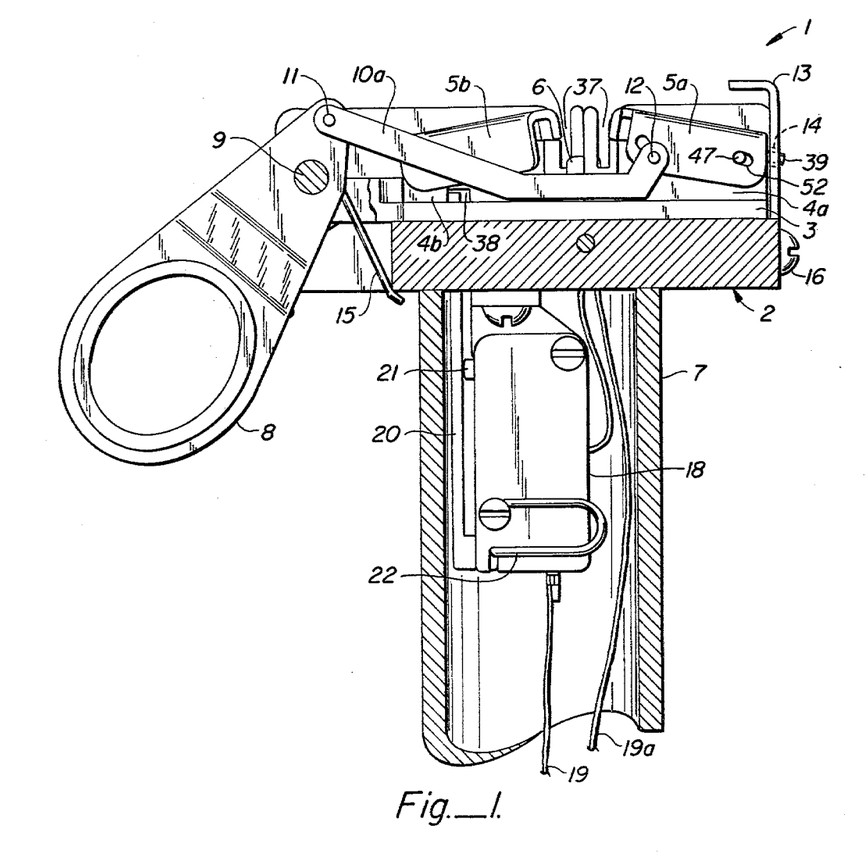
FIG. 1 is a cut-away side view of a preferred embodiment of the yarn splicer of this invention.
Figure 1A:
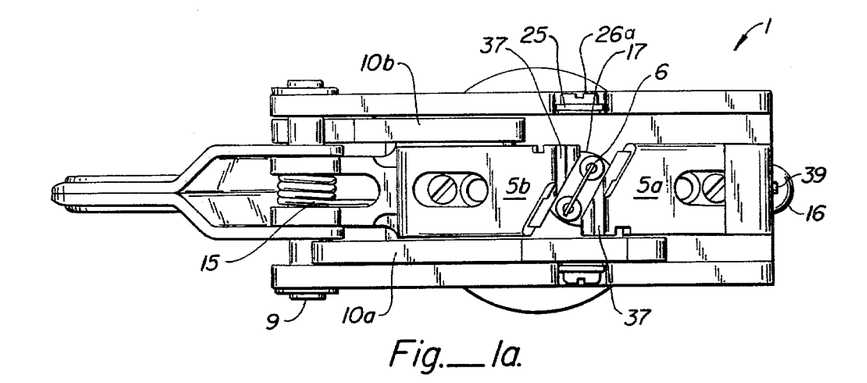
FIG. 1a is a top view of the yarn splicer illustrated in FIG. 1.
Figure 5:
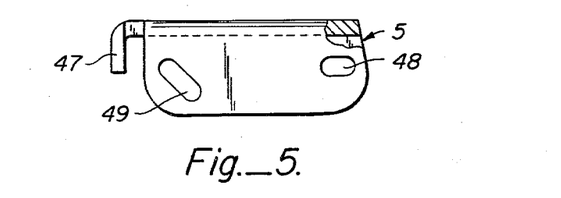
FIG. 5 is a side view detail of yarn clamp 5a or 5b.
Figure 5A:
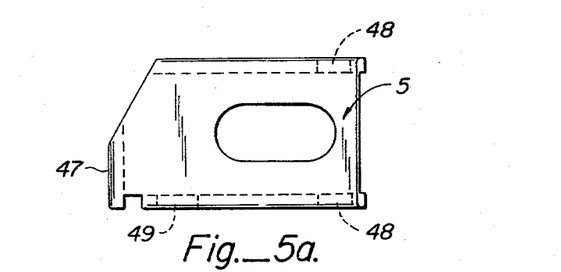
FIG. 5a is a top view detail of yarn clamp 5a or 5b.

The two slide blocks, (FIGS. 4 and 4a) are identical except for the required pin 39 in the right-hand block 4a and the slot 38 in the left-hand block 4b. (For drawing convenience, a single slide block 4 has been shown in FIGS. 4 and 4a with both pin 39 and slot 38). The slide blocks straddle and slide freely on the elevated tongue 30 (FIG. 3) of the slide rail. They are oriented so that the diagonal surfaces 40 face each other and are slidably held to the slide track by capscrews (not shown) passing through slots 41 in the slide blocks into holes 33 and 33a, respectively, (FIG. 3a) in the slide track. Preferably, a ball plunger 42, comprising of a hollow set screw 43 with a spring-loaded ball tip 44, is provided in each slide block. They interact with indents 34 and 35 and 34a and 35b, respectively, (FIG. 3a) in the slide track to restrain motion of a slide block from either of its extreme positions. A slot 37 is provided in each slide block for yarn insertion. Slots are located so that when the slide blocks are in their extreme inward position on the slide track, the diagonal faces 40 meet and the slots line up to form a continuous slot transverse to the sliding axis. p Slide blocks 4a and 4b are provided with yarn clamps 5a and 5b, respectively, to hold the yarns in slots 37 (FIG. 4) while being spliced. The two yarn clamps are identical and are shown in FIGS. 5 and 5a. Each yarn clamp is placed astride its respective slide block so that tang 47 enters yarn slot 37 and is held in place by pin 45 (FIGS. 1 and 4b) passing through slots 48 in the yarn clamp and tightly fitting in the slide block. Motion is imparted to the yarn clamp and slide block by a pin 12 (FIG. 1) which is press-fitted into connecting link 10a or 10b (FIGS. 1 and 1a) and passes through the diagonal slot 49 in the yarn clamp into the horizontal slot 46 (FIG. 4) in the slide block. The sequence of actions as shown in FIG. 1 are as follows: Squeezing the trigger moves pin 12 in link 10a to the left, sliding horizontally in slot 46. Yarn clamp 5a moves left until tang 47 is free to fall into slot 37. Further motion of pin 12 forces the tang downward by the ramp action of slot 49 to clamp the yarn in the bottom of slot 41. Still further motion of pin 12 to the left overcomes the restraint of ball plunger 42 in detent 35a and moves the slide block to the left. When the motion of the trigger is reversed, the tang of the yarn clamp is moved up and out of the yarn slot before the slide block is retracted due to the restraint of the ball plunger in detent 34a. Simultaneously, yarn clamp 5b and slide block 4b move in the same manner in the opposite direction.

Slots 25 (FIG. 2) are provided in the two walls of support block 2 to permit insertion of yarn into the slots 37 in the two slide blocks. Preferably, the support block is provided with spring retainers 24 and 24a, respectively in each slot to hold the yarns in place prior to splicing. They can be fixed to the support body by any suitable fastening means such as screws and washers 26 and 26a.

Figure 6:
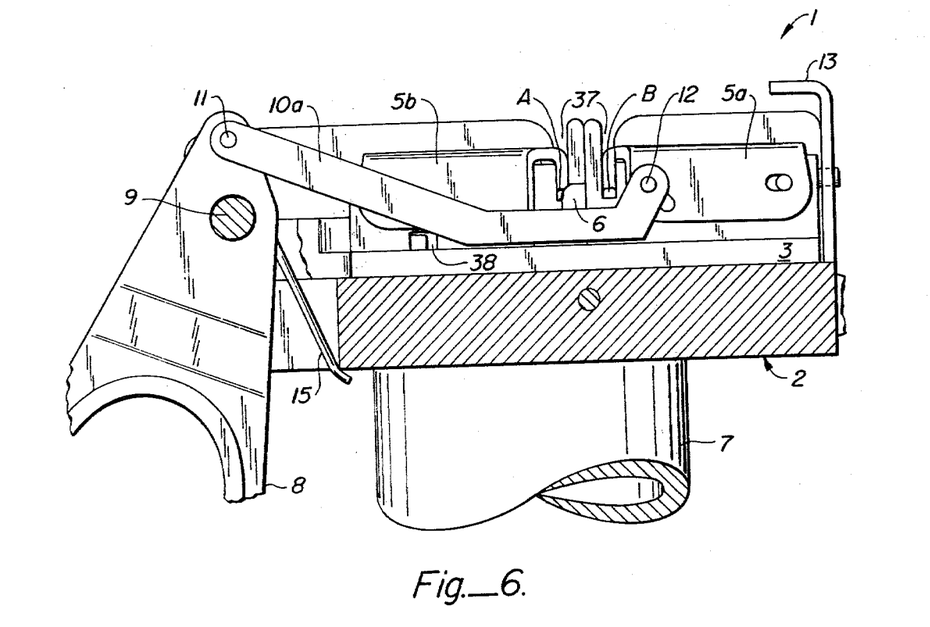
FIGS. 6–9 illustrate operative steps in the operation of the present splicer.
Figure 6A:
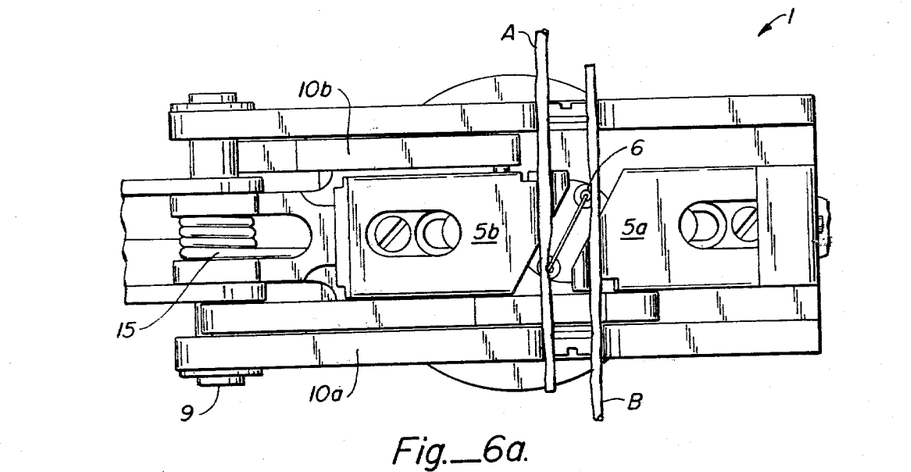

Preferably the heating element 6 is a flat tape mounted horizontally (FIG. 1a) and supported by two vertical conductors passing through insulating block 17. It is placed at an angle to the slide axis (typically about 60°) so that it is about parallel to the diagonal faces 40 of the slide blocks. Its height is adjusted so that it is approximately centered on yarns clamped in position and its length is preferably about equal to the diagonal spacing between yarns at their greatest separation as shown in FIG. 6a. Hole 36 (FIGS. 3 and 3a) in the slide track provides clearance around the heater and conductors.

The splicing operation can be explained by reference to FIGS. 1 and 6 through 9. It should be remembered that the only operations performed by the operator are placing the yarns into their respective slots, squeezing the trigger, and removing the severed yarn tails and the spliced yarn.

Figure 7:
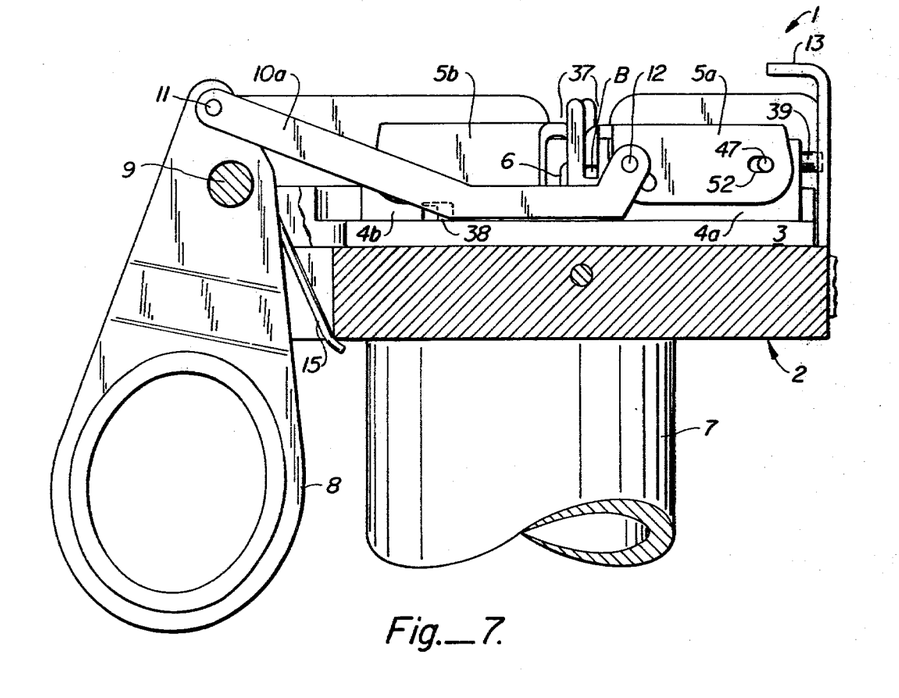
Figure 7A:
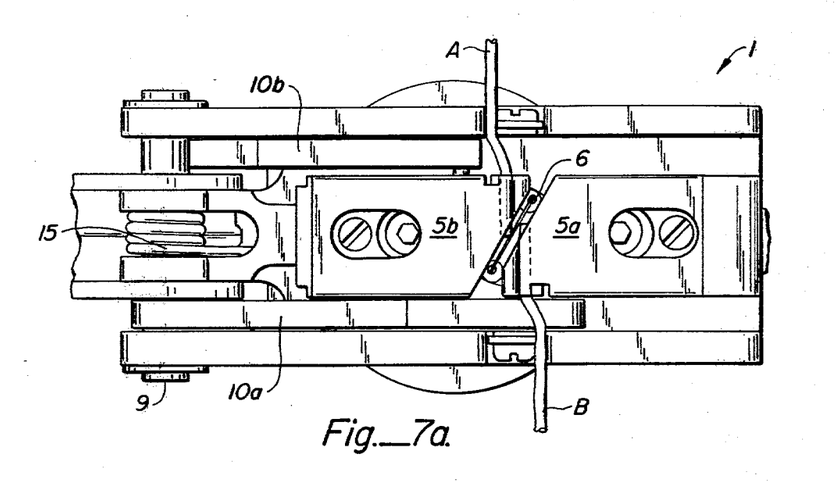
Figure 8:
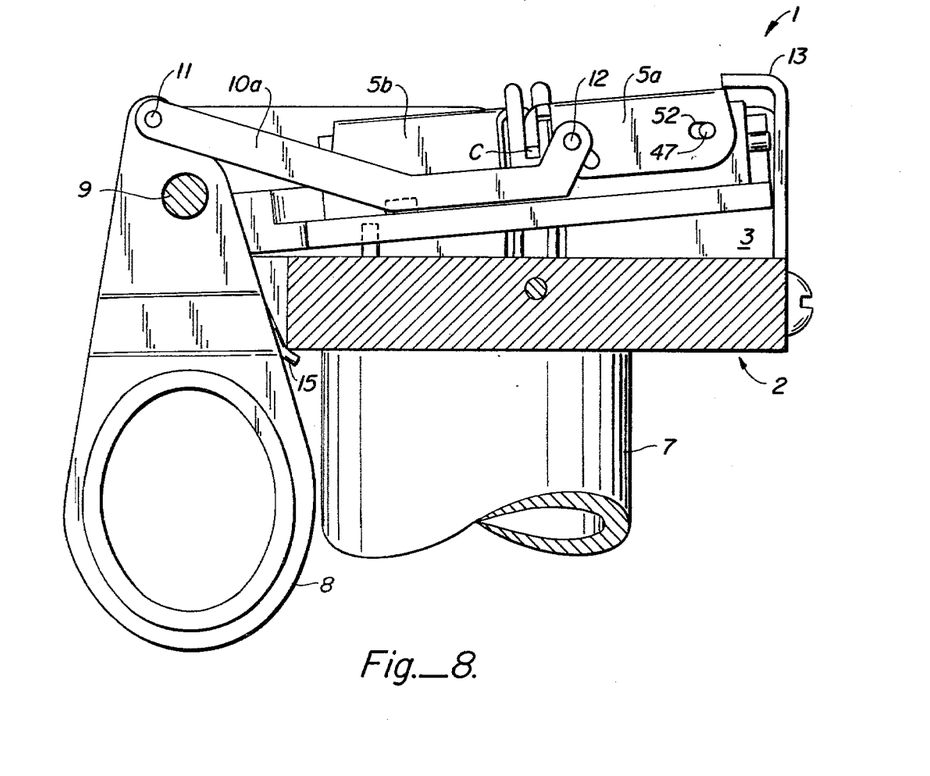
Figure 8A:
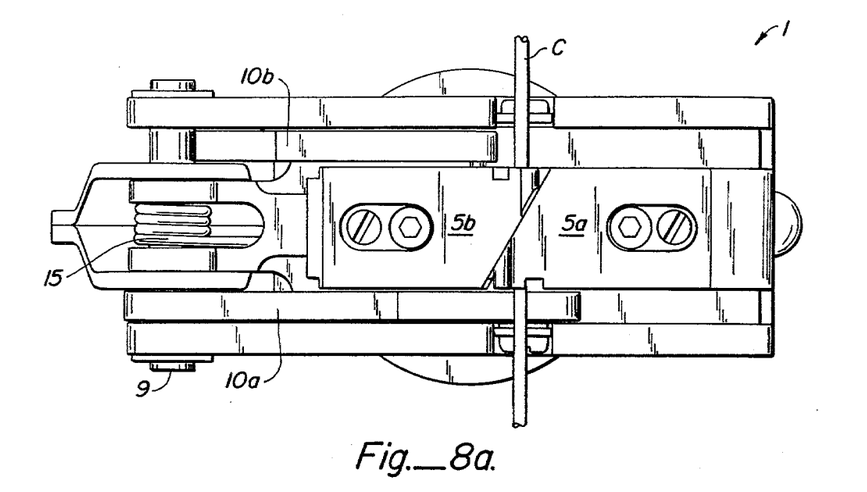
Figure 9:
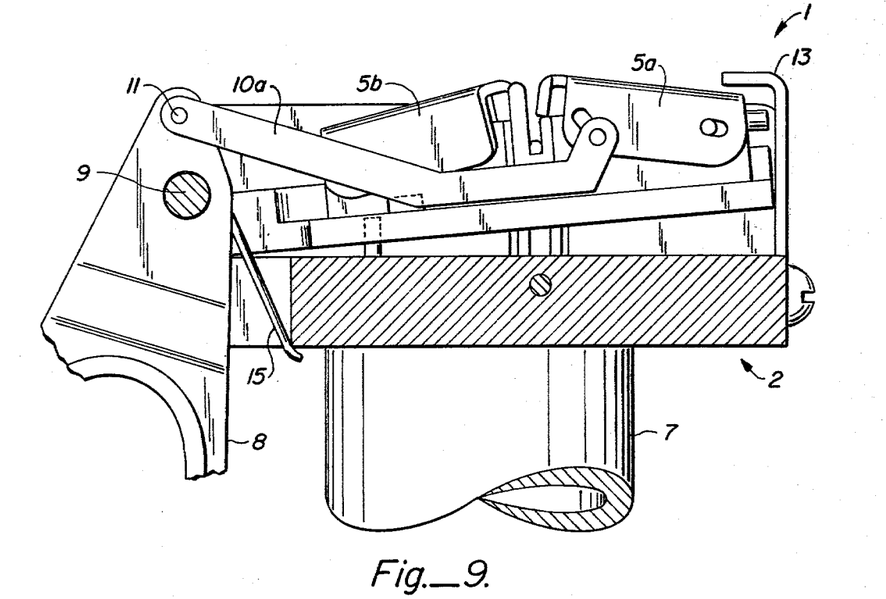
Figure 9A:
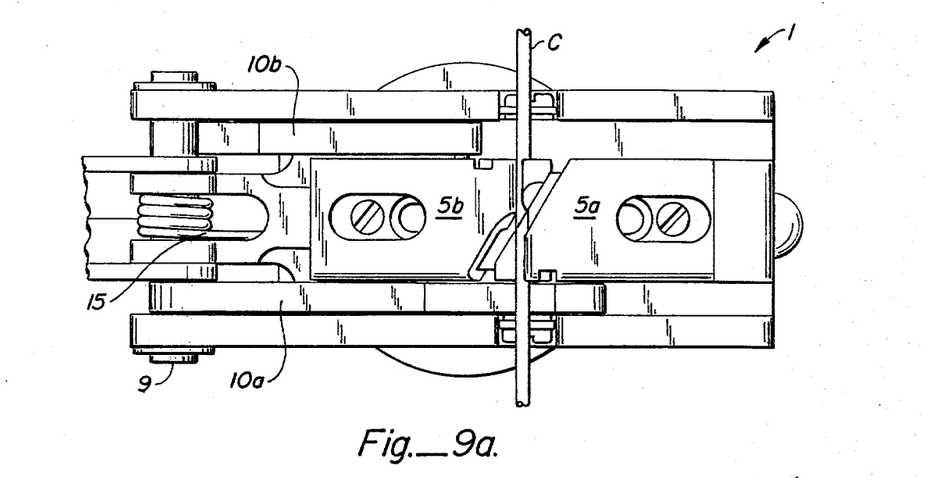

FIG. 1 shows the splicer in the initial open position. The operator merely places a yarn into each slot 37 extending in opposite directions with the respective tails extending slightly beyond the body support and retained by optional spring clips 24 and 24a. The operator then squeezes the trigger toward the handle causing the following sequence of actions: First the yarn clamps move inward and downward to clamp the yarns A and B in their slots as previously described and as shown in FIG. 6. Second, the slide blocks start to move inward, causing switch 18 to turn on and energize the heater. The operator should pause here to remove the yarn tails as they are melted free. FIG. 7 shows this stage with the tails removed and a molten bead formed on the end of each clamped yarn. As squeezing is resumed, pin 39 on the end of the outer slide block (4a) comes out of its socket 14 in the stop plate, slide track 3 tilts upward, turning off the heater and bringing the slide blocks firmly together as they are raised to clear the heater. The trigger is held in this position (shown in FIG. 8) long enough for the joint to cool (about 3 to 5 seconds) and then gradually released. Due to the restraining action of the ball-detent, the slide blocks remain together until the yarn clamps are retracted and the spliced yarn C can be removed as shown in FIG. 9. Continued retraction of the trigger moves the slide blocks apart to clear the heater, allowing the slide track and then the slide blocks to return to their initial position as shown in FIG. 1.

The only step in this operation which requires operator judgement is the duration of the pause and the spacing of the slide blocks while the tails are being removed. The optimum varies somewhat depending on the heater temperature and the yarn size, but can be readily determined by an operator and easily reproduced. Optionally, an intermediate temporary stop could easily be provided for the trigger.

I have found that the present splicing apparatus and method affords a high quality splice in thermoplastic yarns. The splice has good strength and is of sufficiently small size to facilitate the effective use of the spliced yarn in tufting operations. Further, the splicer is of such size that it is conveniently hand-operated and of such simple operation that little operator training is required to make consistently good splices.

Obviously, many modifications of the invention described above and hereinbelow in the claims can be made without departing from the essence of the scope thereof.

What is claimed is:

1. A splicing apparatus for splicing thermoplastic yarns or tapes and adapted to be hand-held, comprising in operative relationship, a handle, a slide support body mounted on said handle, a slide track pivotally mounted on said slide body, first and second slide blocks operatively mounted in facing position with respect to each other on said slide track and each provided with a yarn insertion slot, wherein said yarn insertion slots are substantially parallel to each other; first and second yarn clamping means respectively mounted on said first and second slide blocks and each comprising a tang means for respectively holding yarn in said yarn insertion slots; a hot cutting element means positioned substantially diagonally to said yarn insertion slots for diagonally melt severing said thermoplastic yarns or tapes and wherein said cutting element is operatively connected to a power supply through a switch means for controlling the flow of power to said cutting element and operatively connected to one of the slide blocks through a linkage means for closing said switch; a pivotable trigger means connected to a first hinge arm operatively connecting said trigger means to said first slide block and said first yarn clamping means and a second hinge arm operatively connecting said trigger means to said second slide block and said second yarn clamping means wherein first movement of said trigger will cause said tangs on said yarn clamping means to enter said yarn insertion slots in said slide blocks to clamp yarns in said slots and further movement of said trigger will cause said slide blocks to move toward each other causing one of said slide blocks to activate said linkage means to close said switch thereby energizing said cutting element, and upon further movement of said trigger said hinge arms will cause said slide track to tilt upward to clear the heating element and slide block to disengage said linkage means thereby deactivating said switch, and upon still further movement of said trigger said hinge arms will cause the diagonal faces of said slide blocks to come together so that said yarn insertion slots are in a line and the molten yarn ends are pressed together; a first and second slide block motion restraining means for respectively preventing premature motion of said first and second slide blocks before the yarns clamping action is completed; a vertical restraining means for preventing premature pivoting of said slide track before said cutting element is energized and said yarn tails are severed; and a trigger return spring operatively connected to said trigger for returning said trigger to its original position upon its release thereby activating said first and second hinge arms to successively unclamp the joined yarn, pivot said slide track back to its starting position while moving said slide blocks apart to clear said cutting element, and return said slide blocks to their starting positions.

2. The apparatus of claim 1 wherein at least one of said slide block motion restraining means is a spring loaded ball means mounted in said slide block for releasable motion engagement with detent means in said slide track.

3. The apparatus of claim 1 wherein said handle is hollow and said switch means is mounted inside said hollow handle.

4. The apparatus of claim 1 wherein said apparatus is provided with a stop plate, affixed to said slide body and generally mounted in facing relationship to the back face of said second slide block for limiting upward rotation of said slide track.

5. The apparatus of claim 4 wherein said vertical restraining means comprises a pin extending from the back face of said second slide block and a loosely mating socket in said stop plate wherein pivoting of said slide track is restrained until inward movement of said second slide block cause said pin to clear said socket.

* * * * *